June 23, 1953 — D. P. WRIGHT ET AL — 2,643,155

SIDE DELIVERY SPRAY MACHINE

Filed April 10, 1950 — 2 Sheets-Sheet 1

INVENTORS
David P. Wright
Richard H. Fish
BY
ATTORNEYS

INVENTORS
David P. Wright
Richard H. Flish

ATTORNEYS

Patented June 23, 1953

2,643,155

UNITED STATES PATENT OFFICE 2,643,155

SIDE DELIVERY SPRAY MACHINE

David Porter Wright, Oakland, and Richard Harrison Fish, Morgan Hill, Calif., assignors to Air-O Fan Products Corporation, Gilroy, Calif., a corporation of California Application April 10, 1950, Serial No. 155,082

6 Claims. (Cl. 299—37)

This invention relates to a mechanical or power spray machine for spraying pest or disease control material on orchard trees.

It is a major object of this invention to provide a spray machine which is especially adapted, but not limited, for use to spray orchard trees which are of large proportions including substantial height, or trees characterized by dense foliage.

Another important object is to provide a spray machine, as above, which is of side delivery type and operative to produce upper and lower air-spray blasts into corresponding zones in the tree; the air blasts having a pulsating and sweeping action, whereby to not only attain maximum reach and coverage, but also to cause the foliage—particularly when dense—to open up and permit the spray to accomplish maximum penetration of the tree.

A further object of the present invention is to provide a spray machine, as in the preceding paragraph, which includes a fan casing having an upwardly elongated, lateral discharge volute opening, and a pair of longitudinal vanes pivotally mounted end to end in said opening; the vanes being simultaneously power oscillated but with their strokes timed so that as each vane reaches the end of its stroke and is in an air blast baffling position, the other vane is in an intermediate or open position. This causes the very desirable pulsation of the air blasts. Also as delivered, the air blasts sweep lengthwise of the direction of travel on account of the swinging or oscillating motion of the vanes.

An additional object of the invention is to provide a novel mount and actuating mechanism for the vanes whereby to pivotally support and oscillate the same with their strokes in predetermined timing for the aforesaid purpose.

A separate object of the invention is to provide a spray machine, for agricultural spraying, which is designed for ready and convenient manufacture; the spray unit being compact, sturdy, and relatively simple in construction.

In certain respects, the present invention has features in common with the structure disclosed in our co-pending application entitled Duplex Spray Machine, Serial No. 152,142, filed March 27, 1950.

Still another object of the invention is to provide a practical and reliable spray machine, and one which will be exceedingly effective for the purpose for which it is designed.

These objects are accomplished by means of such structure and relative arrangement of parts as will fully appear by a perusal of the following specification and claims.

Figure 1:
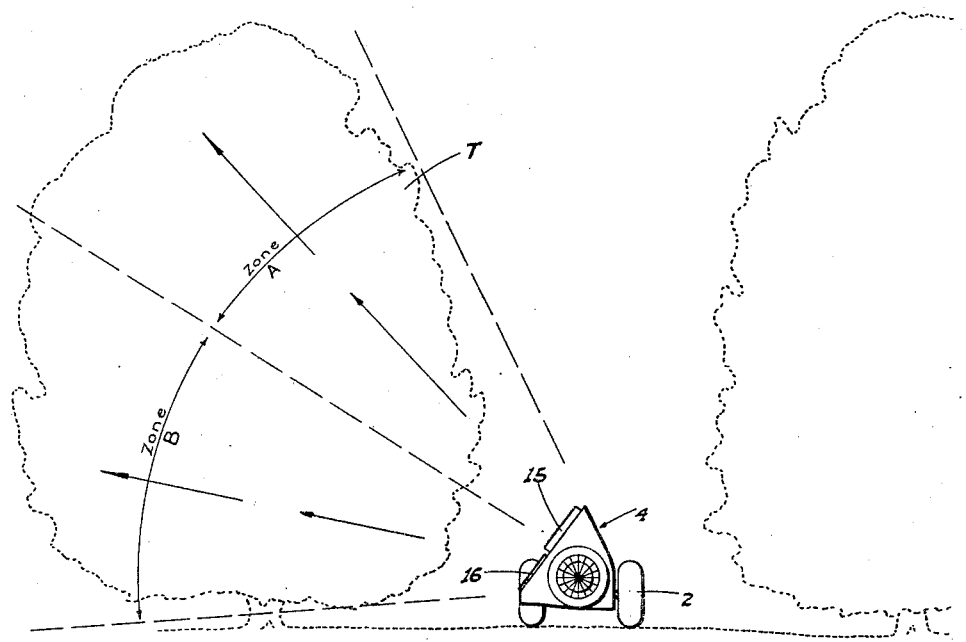
Fig. 1 is a semi-diagrammatic view, taken from the rear end of the machine, showing the latter as in use; the view illustrating the two spray zones.
Figure 2:
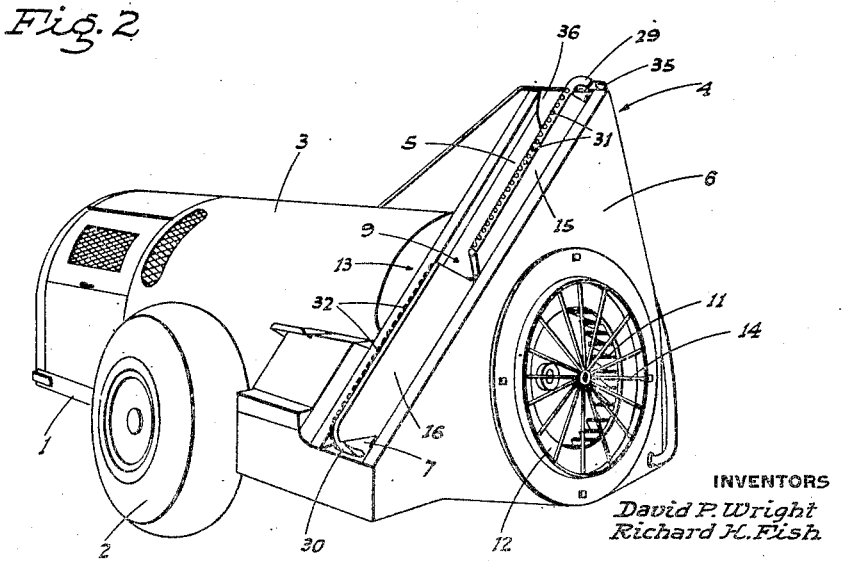
Fig. 2 is a perspective view of the spray machine.
Figure 3:
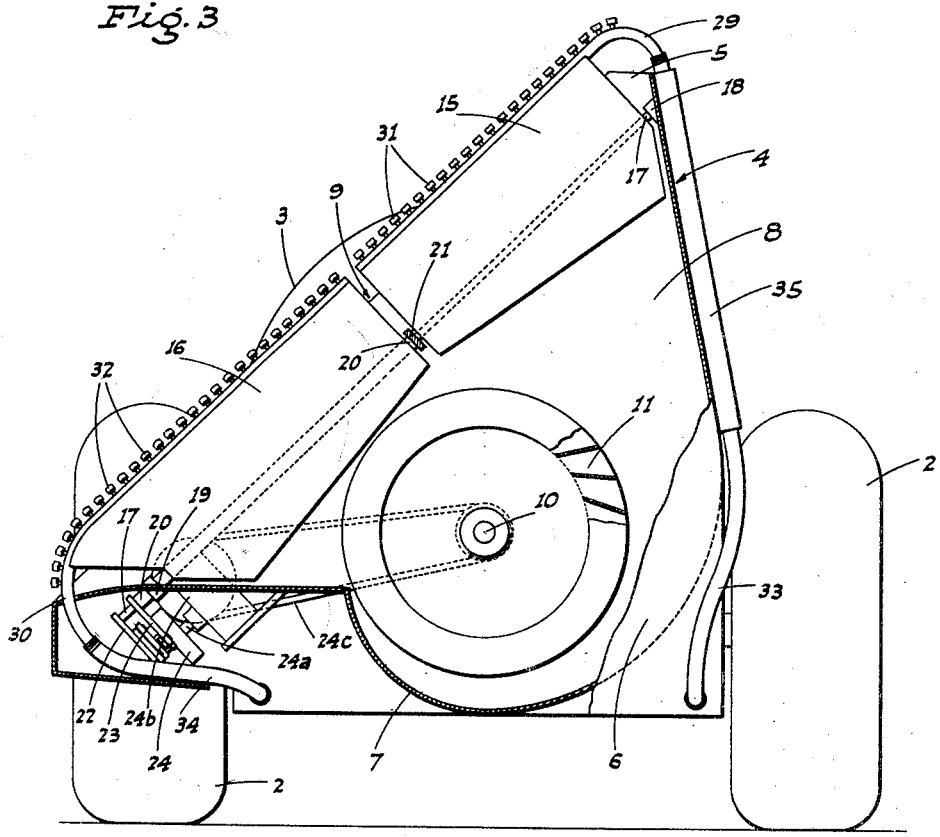
Fig. 3 is an enlarged transverse section taken through the spray unit.

Referring now more particularly to the characters of reference on the drawings, the spray machine is of trailer type, adapted to be coupled, in draft relation, to a tractor; such machine including, generally, a main frame 1 supported, on opposite sides, by pneumatic tire wheels 2. The housing 3 on the frame 1 encloses an engine and a liquid-spray reservoir or tank (neither being shown).

At the rear end thereof the frame 1 supports a fan casing, indicated generally at 4; such fan casing including a front shroud or wall 5 and a rear shroud or wall 6, with a bottom plate 7 connecting therebetween; such bottom plate being of a configuration to provide, with the walls 5 and 6, a volute 8 in the fan casing 4. The volute 8 includes an upwardly and inwardly inclined, lateral discharge, volute opening, indicated at 9.

A longitudinal shaft 10, driven by the engine (not shown) within the housing 3 projects rearwardly into the fan casing 4, and within said casing the shaft supports a centrifugal discharge fan 11; there being concentric, air intake openings in the front and rear walls 5 and 6 respectively; the rear air intake opening being indicated at 12. The air intake opening (not shown) in the front wall 5 is fed from an air access port 13 in the rear end part of the housing 3.

A grille-like guard 14 is mounted on the rear wall 6 in overlying relation to the rear air intake opening 12.

A pair of relatively flat, elongated vanes are disposed end to end and longitudinally in the volute opening 9; the upper vane being indicated at 15 and the lower vane being indicated at 16.

The vanes 15 and 16 lie generally edgewise in the volute opening 9; the outer edge portions of said vanes projecting slightly out of such opening. The vanes 15 and 16 are pivotally mounted for independent swinging or oscillating motion across the volute opening 9, and consequently across the emitting air blast, as follows:

Intermediate its outer and inner longitudinal edges the upper vane 15 is fixed to a longitudinal shaft 17 journaled, at its upper end, in the casing 4, as at 18, and journaled, at its lower end, in said casing, as at 19; the shaft 17 extending full length through the lower vane 16. Said lower vane 16 has a tubular shaft affixed therein and surrounding the adjacent portion of the shaft 17 in turnable relation; the shaft 17 being journaled, at its upper end, in connection with a cross bar 21, while the lower end of said separate shaft 20 employs the journal 19.

The shafts 17 and 20 project different distances below the bottom plate 7 and are fixed, at said lower projecting ends, with radial lever arms, indicated at 22 and 23, respectively.

Forwardly of said radial lever arms 22 and 23 there is a driven crank disc 24 on an axis parallel to the shaft 17 and 20. The crank disc 24 is fixed on an output shaft 24a of a reduction gear box 24b, which gear box is actuated from the longitudinal shaft 10 by an endless belt and pulley unit 24c.

Figure 4:
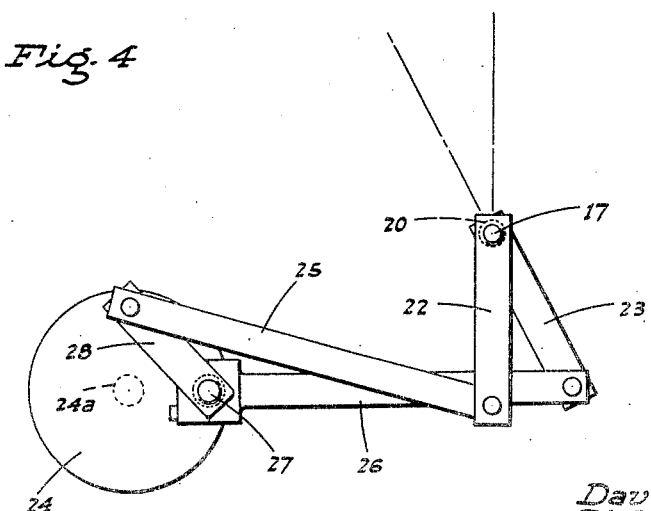
Fig. 4 is a lower end view, detached, of the crank mechanism employed to simultaneously oscillate the vanes in predetermined timed relation.

Links 25 and 26 pivotally connect to the radial lever arms 22 and 23, respectively, and thence extend to adjacent the crank disc 24. The link 26 is direct-connected to the crank pin 27 of the crank disc 24, while the link 25 is pivotally connected to a radial lever arm 28 fixed on said crank pin and projecting therefrom. As shown in Fig. 4, the links are in effect connected to the crank mechanisms in substantially 90° circularly spaced relation. With this arrangement the crank disc 24, working through the links 25 and 26, is operative to oscillate the radial lever arms 22 and 23, together with the corresponding shafts 17 and 20, and the related vanes 15 and 16.

The vanes 15 and 16 are disposed in angular relationship to each other; i. e. are staggered circumferentially of their axes, and the radial lever arms 23 are in corresponding angular relationship to each other. The result is that with the described actuating mechanism for said lever arms 22 and 23, one vane leads the other in their respective strokes, whereby as each vane reaches the end of its stroke and is in an air blast baffling position, the other vane is in an open position for substantially full, or unrestricted air blast thereby. The advantage of this operative sequence will hereinafter appear.

The links 25 and 26 may be adjustable in length to alter the throw of the lever arms 22 and 23, and consequently the stroke of the vanes 15 and 16 in the volute opening 9, as working conditions may require.

The vanes 15 and 16 are fitted, along their outer longitudinal edges, with pipes, indicated at 29 and 30 respectively, and said pipes carry rows of nozzles; the nozzles on the pipe 29 being indicated at 31, and the nozzles on the pipe 30 being indicated at 32.

At their outer ends the pipes 29 and 30 turn downwardly, and are connected to flexible conduits 33 and 34 which lead, in liquid-spray feeding relation, from the tank (not shown) in the housing 3. The flexible conduit 33 may extend through a guard channel 35 on the adjacent side of the fan casing 4.

The volute opening 9 is progressively reduced in width toward its outer end, as at 36, whereby to substantially increase the velocity of the air blast as it emits from said volute opening 9.

By the terms "closed position" and "air blast baffling," as used herein with respect to the vanes 15 and 16, it is not intended to mean that complete closure or full baffling is attained, but to the contrary an air blast continues to pass but in materially reduced volume.

When the described spray unit is in operation, with the machine traveling along a row of trees, the spraying operation occurs as follows:

The liquid-spray material as fed from the nozzles 31 and 32 is carried outwardly by the air blast which flows about the corresponding vane 15 or 16.

As the vanes 15 and 16 are continuously oscillating, the air-spray blast from each such vane has a sweeping action back and forth lengthwise of the direction of travel of the machine.

Additionally, as the upper and lower air-spray blasts emit laterally from the machine, the upper air-spray blast delivers into an adjacent tree T in a high zone A, while the lower air-spray blast delivers into the tree T in a low zone B; such zones A and B being indicated diagrammatically in Fig. 1.

The air-spray blasts emit and deliver into the zones A and B with a pulsating action by reason of the simultaneous oscillation of the vanes 15 and 16, with the timing of the strokes of the vanes such that when one vane is at each end of its stroke and consequently in an air blast baffling position reducing volume, the other or relatively trailing vane is in an intermediate or open position with substantially full air blast thereby. The foregoing timing of the vanes 15 and 16, i. e. with one vane trailing the other in the stroking thereof, is accomplished by means of the crank actuated mechanism hereinbefore described.

The machine in its operation functions effectively, by reason of the described pulsating and sweeping action of the air-spray blasts, to spray orchard trees of large proportions, including height, and of dense foliage.

The combination of the pulsation and oscillation or sweeping of each the upper and lower air blasts reaches the corresponding zone A or B of the tree T, and shakes and opens up the dense foliage, allowing the air-spray material to effectively and efficiently penetrate the tree. The sweeping action of each air blast is also important, for the reason that as the machine approaches and passes a tree said air-spray blasts strike the tree first on the approaching side, thence on the immediate adjacent face, and finally on the leaving side.

As the nozzles 31 and 32 discharge directly outwardly from the vanes 15 and 16, respectively, proper and effective directional control of the spray into the air blast is maintained irrespective of the oscillation of said vanes.

It has also been ascertained that more equal distribution of the air in each the upper and lower blasts from the volute opening 9 is obtained with vanes which taper slightly in length, as shown, and toward their inner ends; the taper being on the inner edges.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the fol- lowing is claimed as new and useful, and upon which Letters Patent are desired:

1. An agricultural machine comprising a fan casing having a volute and a lateral discharge volute opening, a driven centrifugal fan in the casing operative to create an air blast in the volute and through the volute opening, the latter being elongated and extending upward at an inward incline, a vane assembly in the volute opening including a pair of longitudinal end to end vanes, means pivotally mounting the vanes in the volute opening for oscillation across the air blast between relatively closed, air blast baffling and relatively open, free air blast positions, said vane mounting means including co-axial shafts secured to the vanes, one shaft being tubular and the other projecting therethrough whereby both project from the same end of the vane assembly, a power actuated crank mechanism connected to the projecting ends of said shafts operative to simultaneously oscillate the vanes between said positions with the stroke of one vane trailing the stroke of the other to an extent such that when said one vane is relatively closed, the other is relatively open, and means to deliver a spray into the air blast.

2. An agricultural machine comprising a fan casing having a volute and a lateral discharge volute opening, a driven centrifugal fan in the casing operative to create an air blast in the volute and through the volute opening, the latter being elongated and extending upward at an inward incline, a vane assembly in the volute opening including a pair of longitudinal end to end vanes, means pivotally mounting the vanes in the volute opening for oscillation across the air blast between relatively closed, air blast baffling and relatively open, free air blast positions, said vane mounting means including co-axial shafts secured to the vanes, one shaft being tubular and the other projecting therethrough whereby both project from the same end of the vane assembly, a power actuated crank mechanism connected to the projecting ends of said shafts operative to simultaneously oscillate the vanes between said positions with the stroke of one vane trailing the stroke of the other to an extent such that when said one vane is relatively closed, the other is relatively open, a pipe extending along the outer edge of each vane, a row of nozzles projecting from each pipe, and means to feed spray material to the nozzles while the vanes are oscillating.

3. In a spray machine including a fan casing having an elongated discharge air blast slot, means for discharging an air blast outwardly through the slot, a pair of elongated vanes arranged in longitudinal end to end relation pivotally mounted longitudinally in the slot for independent oscillation transversely of the slot across the air blast, means operative simultaneously to oscillate the vanes with one thereof trailing the other, a spray pipe secured on and extending along the outer edge of each vane, and flexible supply hoses connected between a source of supply of spray material and the pipes at opposite ends of the vanes.

4. In a spray machine, the combination of a fan casing having an elongated air blast outlet slot, a power driven fan operative in the casing to create an air blast outwardly through the slot, a pair of elongated transversely substantially flat vanes pivotally mounted in end to end relation in the casing longitudinally of the slot and transversely edgewardly extended through the slot, said slot being defined by side walls outwardly convergent on opposite sides of the vanes creating a Venturi effect in the air blast on opposite sides of the vanes, driving means connected to the vanes operative simultaneously to oscillate the vanes transversely of the slot across the air blast with one thereof in following relation to the other, a spray pipe mounted on the outwardly extended edge of each vane, and a flexible conduit means connected to the spray pipe of each vane adapted to supply spray material thereto.

5. In a spray machine, the combination of a fan casing having an elongated air blast outlet slot, a power driven fan in the casing operative to create an air blast outwardly through said slot, a pair of elongated vanes pivotally mounted in end to end adjacent relation in the casing inwardly adjacent to the slot and longitudinally thereof and transversely extended edgewardly through the slot, said slot being defined by side walls outwardly convergent on opposite sides of the vanes creating a Venturi effect in the air blast on opposite sides of the vanes, a power actuated crank mechanism, means individually connected to the vanes and to the crank mechanism in substantially 90° circularly spaced relation on said mechanism for simultaneously oscillating the vanes transversely of the slot across the air blast with one of the blades trailing the other whereby the Venturi effect on opposite sides of the vanes are oppositely varied, a spray pipe secured along the outer edge of each vane, spray nozzles mounted on each of the pipes and outwardly extended from their pipes' respective vanes, and a flexible spray supply hose connected to each pipe and to a source of spray supply.

6. An agricultural spray machine comprising a fan casing having an elongated air blast discharge slot, power driven means in the casing for creating an air blast outwardly through the slot, a plurality of elongated transversely flat blades pivotally mounted on a common axis longitudinally of the slot for independent pivotal movement and edgewardly extended from the axis outwardly through the slot and edgewardly from the axis inwardly from the slot, means operative simultaneously to oscillate the vanes successively across the air blast, a spray pipe mounted along the outer edge of each vane, nozzles mounted on each of the spray pipes and outwardly extended in substantial alignment from their respective vanes, and flexible supply conduits individually interconnecting each pipe and a source of supply of spray material.

DAVID PORTER WRIGHT.
RICHARD HARRISON FISH.

References Cited in the file of this patent

UNITED STATES PATENTS

| Number | Name | Date |
|---|---|---|
| 2,321,792 | Bowie | June 15, 1943 |
| 2,429,374 | Shade | Oct. 21, 1947 |
| 2,435,091 | Meyer | Jan. 27, 1948 |
| 2,583,753 | Spring et al. | Jan. 29, 1952 |

FOREIGN PATENTS

| Number | Country | Date |
|---|---|---|
| 588,592 | Great Britain | May 28, 1947 |